United States Patent [19]

Valentini

[11] Patent Number: 5,365,838
[45] Date of Patent: Nov. 22, 1994

[54] MACHINE FOR THE EXTRACTION OF JUICE FROM GRAPES

[76] Inventor: Valentino Valentini, Via Filippo de Grenet n. 26, 00129 Roma, Italy

[21] Appl. No.: 17,457

[22] Filed: Feb. 11, 1993

Related U.S. Application Data

[63] Continuation of Ser. No. 691,035, Jun. 18, 1991, abandoned.

[30] Foreign Application Priority Data

Nov. 2, 1989 [IT] Italy ................... 48515 A/89

[51] Int. Cl.$^5$ .............................................. B30B 9/22
[52] U.S. Cl. ........................ 100/112; 100/118; 100/139; 100/152; 100/191; 100/211
[58] Field of Search ............... 100/45, 48, 110, 112, 100/118, 139, 140, 141, 151, 152, 179, 187, 191, 211

[56] References Cited

U.S. PATENT DOCUMENTS

| | | | |
|---|---|---|---|
| 753,696 | 3/1904 | Geiger | 100/152 |
| 2,324,869 | 7/1943 | Oman | 100/151 |
| 3,106,152 | 10/1963 | Coffelt | 100/152 |
| 3,130,667 | 4/1964 | Coffelt | 100/118 |
| 3,446,139 | 5/1969 | Coffelt | 100/118 |
| 3,453,951 | 7/1969 | Malarkey | 100/118 |
| 3,459,122 | 8/1969 | Pastoors | 100/118 |
| 3,459,123 | 8/1969 | Begiebing | 100/152 |
| 3,592,127 | 7/1971 | Cooley | 100/118 |
| 3,613,564 | 10/1971 | Adamski | 100/152 |
| 4,311,550 | 1/1982 | Kerttula | 425/371 |
| 4,334,466 | 6/1982 | Spiegelberg | 100/45 |
| 4,788,910 | 12/1988 | Tichy | 100/152 |
| 5,081,921 | 1/1992 | Gregoire | 100/211 |

FOREIGN PATENT DOCUMENTS

| | | | |
|---|---|---|---|
| 236173 | 11/1961 | Australia | 100/211 |
| 741555 | 8/1966 | Canada | 100/179 |
| 633675 | 2/1928 | France | 100/118 |
| 1204824 | 1/1960 | France . | |
| 2530424 | 1/1984 | France . | |
| 2582985 | 12/1986 | France . | |
| 266903 | 11/1913 | Germany | 100/110 |
| 3039248A1 | 5/1982 | Germany . | |

Primary Examiner—David A. Scherbel
Assistant Examiner—Randall E. Chin
Attorney, Agent, or Firm—Kenyon & Kenyon

[57] ABSTRACT

The horizontal press appears as an elongated hollow structure (1) of flat profile resting on a frame (2a, b, c, d), and comprises a ram (6) reciprocated by a fluid power cylinder (5), a hopper (8) through which crushed and stemmed grapes fall into an inlet chamber (9) coinciding with the space swept by the ram, and a compression chamber (112) of tapered longitudinal section terminating in a narrow outlet (13) from which the pressed skins emerge. The top of the compression chamber consists in the flexible undersides (115) of a succession of inflatable cushions (120a ... n) by which a downward compressive force is applied to the grapes, whilst the bottom takes the form of a continuous belt (122) fashioned from a filtering material, looped flexibly around at least two end rollers (123, 124) and supported by a frame (128) in such a way as to pass above and below a trough (125) from which the filtered juice is drawn off by conventional means.

28 Claims, 4 Drawing Sheets

MACHINE FOR THE EXTRACTION OF JUICE FROM GRAPES

This application is a continuation of application Ser. No. 07/691,035, filed on Jun. 18, 1991, now abandoned.

The present invention relates to a machine that permits the extraction of juice from grapes, and of filtering the extracted juice, in one continuous operation.

Equipment currently used by wine producers includes horizontal presses known in Italy as sgrondatori or smostatori (in effect 'drainers' or 'de-musters') which serve in the making of white and rosé wines to separate fresh must from grapes, leaving behind the skins. Many such presses exist, differing in construction and operation but falling essentially into two main categories, namely non-continuous and continuous. A non-continuous type of press appears as a horizontally disposed cylindrical vessel into which stemmed and crushed grapes are introduced and then compressed mechanically, hydraulically or pneumatically in order to extract the juice, which flows either to a trough located externally of the cylinder or into cavities formed in the cylinder itself. With extraction accomplished, compression ceases and the skins are removed. The continuous press is a machine installed between the initial crusher and a conventional press, and permits of removing the skins substantially without any pause during operation, the crushed grapes being pressed sufficiently to bring about a swift separation of the fresh juice, whereupon the skins are ejected. Presses of the types outlined above betray certain drawbacks, among which, for example, is the length of time taken for the juice to emerge; this may be due to the bulk of the advancing mass of grapes, or to the fact that the compressive force applied is either excessive or at any rate uneven, or again to abrasion of the skins and the consequent build-up of solid matter. Whether as a result of lengthy percolation or of an uneven pressing force, the wine-making operation is adversely affected.

At all events, the fresh must expressed by means of such machinery requires filtration; this is a step that needs to be effected prior to fermentation, as recent experience has shown that the fermentation process requires as clean a juice as possible if the wine is ultimately to possess best obtainable scent, taste and other organoleptic properties, and resist deterioration. The greater the force applied to the skins, the greater will be the filtration requirement; by the same token, the filtering step must be completed in the shortest time possible.

As the conventional presses in question incorporate no means of filtration, the fresh juice has to be directed as swiftly as possible into pressure or vacuum filters of notably large proportions, which consume commensurately notable quantities of fossil flour, or into costly centrifugal separators.

Accordingly, the object of the present invention is to provide a machine for the extraction of juice from grapes which, operating continuously, is able to overcome the drawbacks mentioned above.

The stated object is comprehensively realized in a machine as characterized in the appended claims, which consists in a horizontally elongated hollow structure, exhibiting a substantially rectangular cross section significantly less in height than in width and remaining constant for substantially its entire length, supported by a frame and comprising, in longitudinal succession: pushing means embodied in part as a ram slidably reciprocated internally of and in fluid tight association with the hollow structure at one end; a gravity feed hopper through which crushed grapes pass into an inlet chamber coinciding with the space swept by the sliding ram; a compression chamber of progressively narrowing longitudinal section terminating at the end of the structure opposite from the pushing means in an opening of cross section smaller than the overall cross section of the hollow structure, from which the pressed grape skins are ejected, enclosed and encompassed uppermost by a surface resiliently subject to the action of means by which to apply a predetermined pressure to the mass of skins, and at bottom by a rigid flat permeable baffle affording passage to the juice; a generously proportioned trough positioned beneath the baffle, and means by which the juice passing through the baffle and into the trough is directed away from the machine.

In operation, the mass of crushed grapes fed in through the hopper is thrust forward intermittently by the reciprocating pushing means to occupy a succession of areas, progressively decreasing in volume, of the compression chamber.

Advantageously, the machine will further comprise an adhering layer or sheet of flexible material located between the mass of skins and the surface resiliently subject to the action of the pressure means, which serves to reduce friction and thus prevent wear on the surface generated by the skins during their forward motion.

The surface resiliently subject to the action of pressure means might be embodied as a rigid panel, pivoted at the end first encountered by the crushed grapes and angled in the longitudinal direction.

Alternatively, the surface may coincide with the underside of a single inflatable cushion anchored uppermost to the compression chamber. In a further variation on this same alternative embodiment, the resilient surface of the compression chamber may be composed of a plurality of distinct, independently inflatable elements arranged in succession within the hollow structure, each one of which exhibiting a cross sectional area greater than that of the preceding element.

The invention is characterized further in that the permeable flat bottom of the hollow structure can be embodied as a moving belt of flexible filtering material carried by a frame and looped around at least two end rollers, at least one power driven, with the generously proportioned collection trough located between the top and bottom branches of the loop, and again comprising means by which the juice percolating into the trough through the moving flat bottom of the compression chamber is directed away from the machine.

The filtration belt consists either in a single layer of one type of material or a sheet combining several layers of different materials, selected to given the desired filtration capability.

The main advantage afforded by the invention, more especially in the second embodiment described, is that the operations of pressing and filtration can be effected substantially in a single step and with one machine only; moreover, the level of filtration achieved will be sufficient by normal standards for fermentation purposes. The pressure applied to the mass of crushed grapes, whether by hydraulic or pneumatic, or by mechanical means, is adjustable according to the type and quality of grape and the results it is wished to achieve. Filtration can be more or less fine depending upon which mesh size is adopted for the permeable belt constituting the bottom of the compression chamber, the selection of which will in turn depend on the hourly output to be obtained.

A further advantage of the machine according to the invention stems from the fact that it consists in a structure through which the distance percolated by the pressed juice is reduced as far as possible thanks to the notably flat cross section of the advancing mass of grapes, i.e. significantly less in height than in width.

Yet another advantage of the machine according to the invention derives from the fact that one wall of the compression chamber is resiliently flexible or resiliently capable of movement, with the result that singularly low levels of extracting pressure can be applied.

The invention will now be described in detail, by way of example, with the aid of the accompanying drawings, in which.

Figure 5:
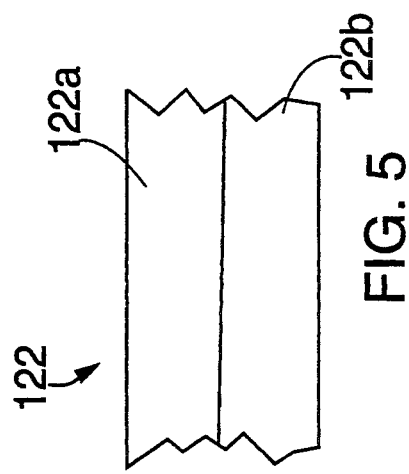

FIG. 5 is a side view of a portion of filtering belt 122 comprising a multi-layered sheet of two different materials 122a and 122b.

Figure 1:
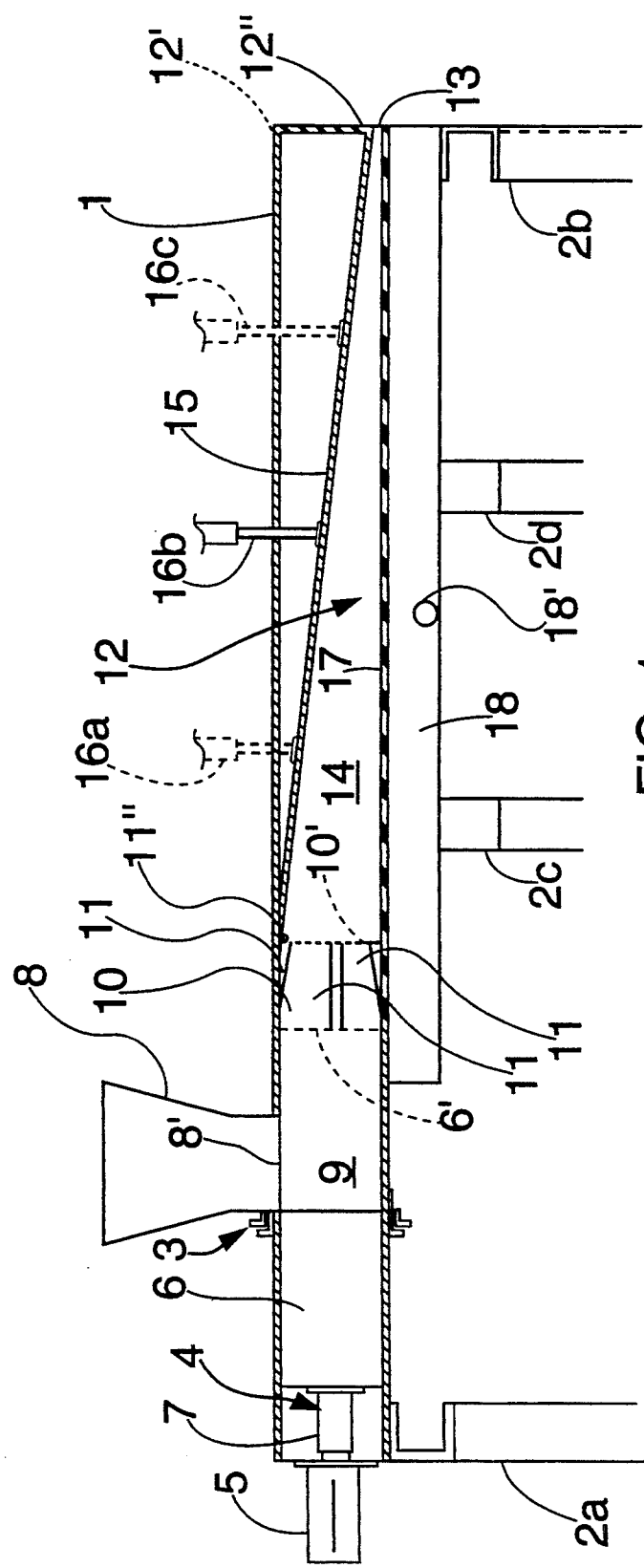
FIG. 1 is the schematic representation of a first embodiment of the machine according to the present invention, viewed in longitudinal section through a central axis.

With reference to FIG. 1, which illustrates a first possible embodiment of the machine according to the present invention, 1 denotes a hollow, horizontally elongated structure, in its entirety, of which the cross section is shallow, preferably rectangular, and remains substantially constant along the total length of the structure 1. The hollow structure 1 rests on a supporting frame, shown schematically as uprights and cross members 2a-2b and 2c-2d located respectively at the two ends and in intermediate positions, and consists essentially in two parts of which the first, located at one end and associated with the remaining second part by way of peripheral sealing means denoted 3, comprises pushing means 4 embodied for example as a fluid power cylinder 5 mounted externally to the hollow structure 1, and a ram 6, fastened to the rod 7 of the cylinder 5 and reciprocated internally of the hollow structure 1. The ram 6 exhibits a cross section matched to that of the hollow structure 1, in such a way as enables it to slide in fluid-tight association, i.e. in a close prismatic fit, with the inside of the hollow structure 1.

8 denotes a hopper through the bottom opening of which crushed grapes fall freely into the interior of the hollow structure 1, and more exactly, into an inlet chamber 9 of which the volume is compassed within that swept by the ram 6. When the ram 6 is in the retracted position (bold line in FIG. 1), the bottom opening of the hopper 8 remains entirely unobstructed, whereas with the ram in the extended position (see phantom line denoted 6'), the bottom opening is blocked (line 8').

10 denotes an expansion chamber positioned forward of the ram 6, in the feed direction, of which the function is to accommodate the backward thrust of the mass of grapes driven forward previously by the ram 6. The chamber 10 is defined longitudinally by the phantom line 6' aforementioned and a phantom line parallel thereto denoted 10' and will be seen to afford peripheral projections 11, of which the transverse dimension increases progressively along the feed direction, designed to arrest any backward movement of the mass of skins.

12 denotes a chamber internally of which the grape skins are compressed, extending from the forward end 10' of the expansion chamber 10 to a transverse plane 12' containing an outlet 13 of cross section smaller than that of the main body of the hollow structure 1, through which the pressed skins are ejected. The compression chamber 12 is encompassed on either side by the flank walls of the hollow structure (denoted 14 in FIG. 1), and uppermost by a surface denoted 15. In FIG. 1, this same surface 15 is embodied as a rigid panel hinged about an axis denoted 11' coinciding with the plane 10' between the chambers 10 and 12, angled downwards in the longitudinal direction to terminate on a level with the top of the outlet 13, and capable thus of a limited degree of movement afforded by a slot 12" coinciding with the transverse plane denoted 12'; accordingly, the compression chamber 12 decreases progressively in cross section from end to end.

The top panel 15 is associated with means by which to apply pressure to the skins, schematically illustrated in FIG. 1 as fluid power cylinders 16a, 16b and 16c of which the rods are connected to the side of the panel 15 opposite from that offered to the skins.

In this first embodiment of the invention, the bottom of the compression chamber 12 consists in a rigid baffle 17 suitably pierced to allow passage of the separated juice from one side to the other. No further description of such a rigid baffle 17 is offered, given that any suitable screen or drainer panel of conventional embodiment might be adopted. Juice falls from the compression chamber into a generously proportioned collection trough 18 that will be equipped with means (not illustrated) by which to draw off the liquid through an outlet schematically denoted 18'.

Operation of a machine thus embodied will now be described.

Crushed grapes loaded in by way of the hopper 8 are fed through the hollow structure 1 by the pushing means 4, each extension of the ram 6 preferably shutting off the bottom opening of the hopper; as the amassing fruit is thus forced into the tapering compression chamber 12, its tendency to swell back will be suitably checked by the projections 11 of the expansion chamber 10. Inside the compression chamber 12, the skins are subjected to pressure applied resiliently by the rigid panel 15 and its associated means 16a, 16b, 16c, according to the prescribed extraction cycle. The pressed skins are forced from the outlet 13 at the end of the hollow structure 1, whilst the juice percolating through the baffle 17 at the bottom of the chamber 12 and into the trough 18 is directed away to the next step of the process.

Figure 2:
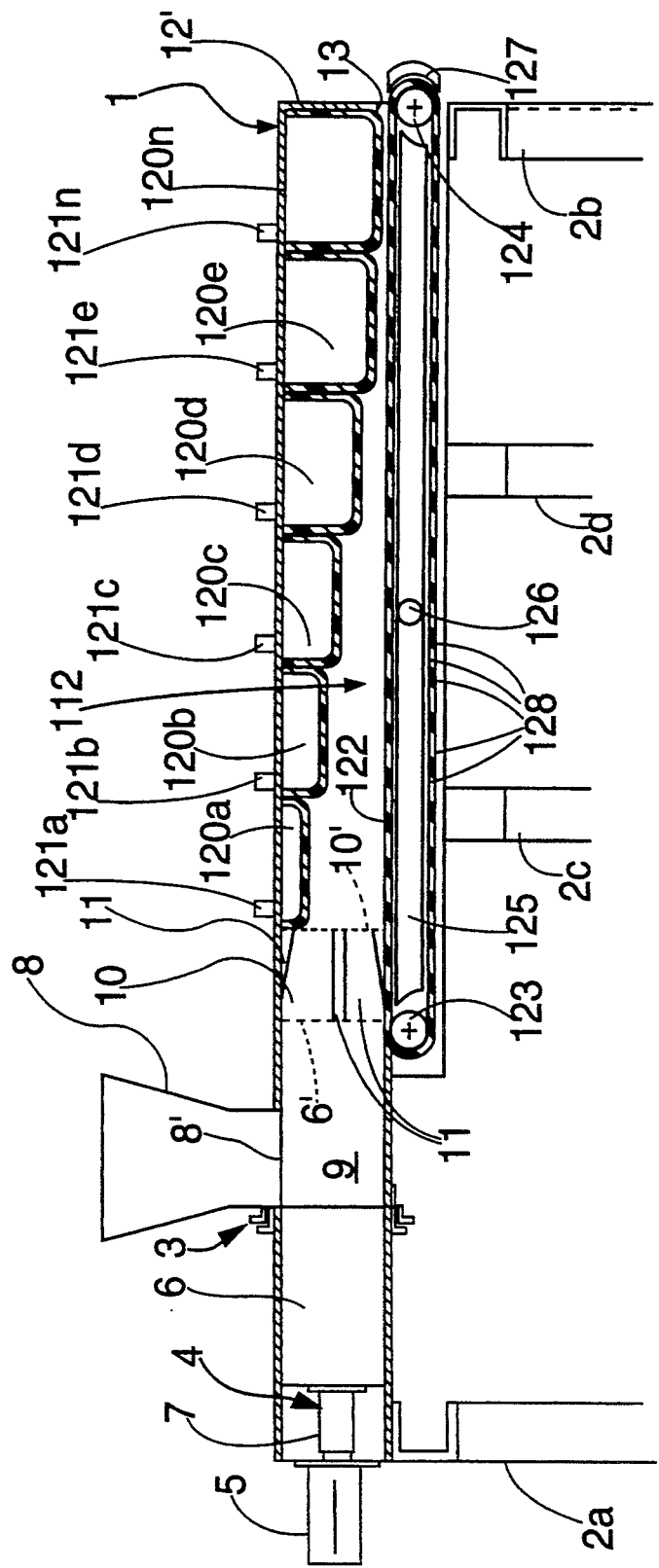
FIG. 2 is the schematic representation of a second embodiment of the machine according to the present invention, viewed in longitudinal section through a central axis.
Figure 3:
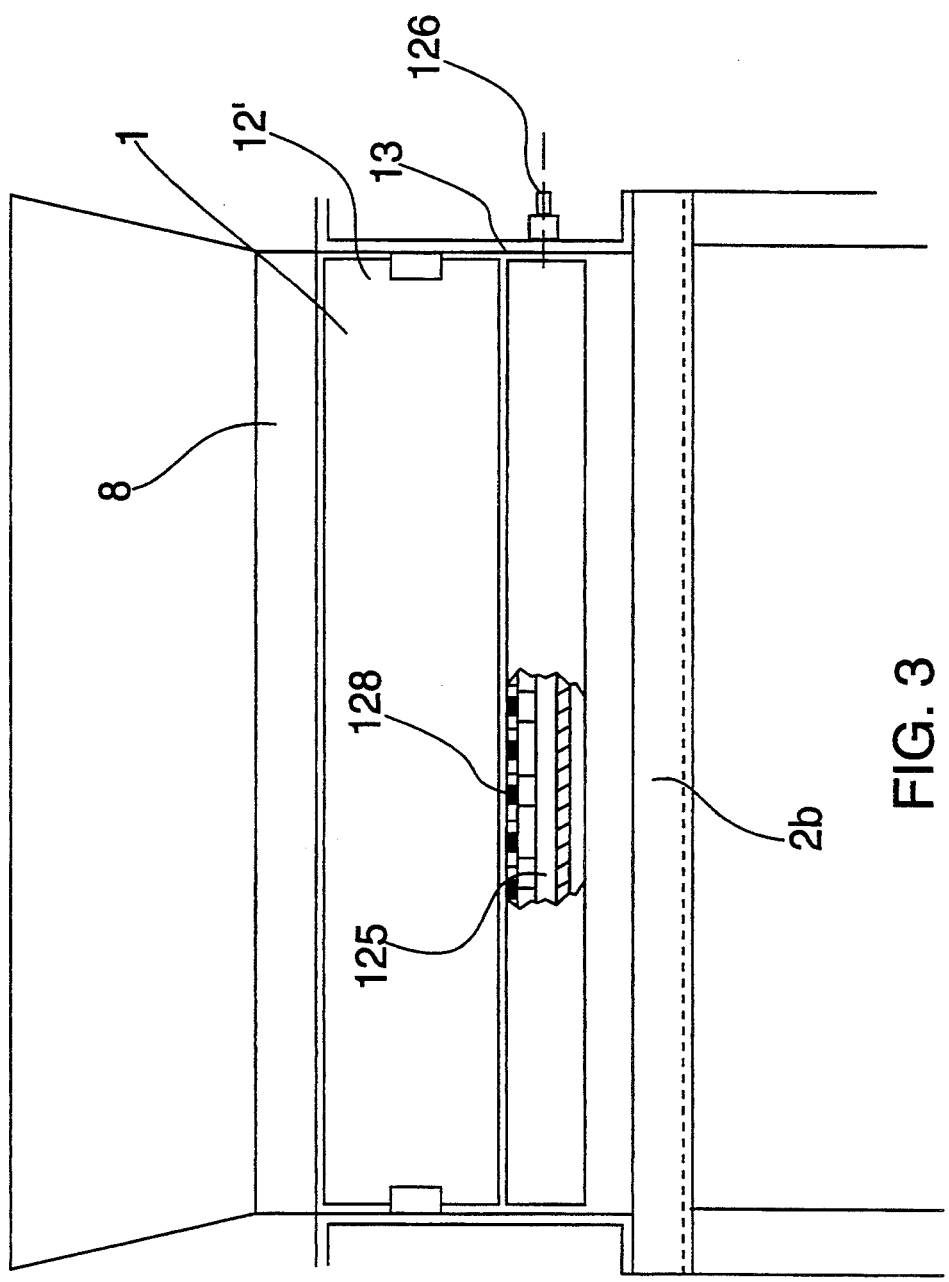
FIG. 3 shows the second embodiment of the machine according to the present invention in a vertical elevation from the rear, i.e. from the end at which the pressed skins emerge.

FIGS. 2 and 3 illustrate a second embodiment of the invention. Parts common to the first embodiment are denoted by the same numbers, and warrant no further description.

The differences between this second embodiment and the first relate principally to the compression chamber, denoted 112.

The uppermost surface 115 of the chamber 112 in this instance, angled likewise between the same two sections 10' and 12' is elastically deformable and coincides with the downwardly directed faces of a plurality of inflatable elements 120a, 120b, 120c, 120d, 120e . . . 120n arranged in succession within the hollow structure 1 and anchored to its uppermost part. Each such inflatable element exhibits a cross section smaller than that of the following element, considered in relation to the path of the advancing mass of grapes.

Means by which to apply pressure to the skins fed longitudinally through the hollow structure consist in a pressurized fluid supplied to and exhausted from the elements 120a . . . n by way of respective ports 121a, 121b, 121c, 121b, 121e, 121n to the end of bringing about their inflation and deflation.

Pressure on the skins from the inflatable elements making up the top surface 115 of the compression chamber 112 can be applied either uniformly and constantly, or alternatively, applied selectively from one element to another according to the type of extraction cycle required.

The bottom of the compression chamber 112 in this embodiment consists in one branch of a moving belt loop 122 fashioned from a filtering material and passed around at least two transversely disposed end rollers 123 and 124, one of which power driven (e.g. that denoted 124), positioned beneath and coinciding with the two ends of the chamber 112.

The moving belt 122 will be fashioned preferably in a stainless steel mesh of suitable permeability, supported by transverse slats denoted 128 in FIG. 2. The movement of the belt is timed to coincide with the forward stroke of the ram 6.

125 denotes a collection trough positioned beneath the hollow structure 1, located between the top and bottom branches of the belt loop and encompassing the entire area of the compression chamber 112.

As in the first embodiment, the trough 125 affords an outlet 126 by way of which the juice is directed away from the machine. The filtration belt 122 is provided further with de-encrusting and scraping means breasted with the roller 124 at the outlet end 12' of the hollow structure 1; such means are represented schematically as a brush 127. Washing means will also be installed, serving to clean off the mesh when situated below the collection trough, i.e. on its non-operative return travel; such means (not illustrated in the drawings) might consist in nozzles from which to jet water or other cleansing fluids under pressure, and could be made to operate continuously, given that the operative branch of the belt 122 remains shielded from beneath by the collection trough 125.

The movement of the belt 122 is interlocked to that of the pushing means 4, in such a way as to index with each stroke either through the full length of the top branch or through fractions thereof. Thus, one has a succession of alternating movements and pauses, of short duration, programmed in cycles to suit the type of grape and the results required.

The crushed grapes in the compression chamber 112 are invested by a steadily applied force from the inflatable elements 120a, b, c, d, e . . . n, which can be pressurized to pre-calculated and programmed values, whether constant, or variable according to the dwell and precise location of the mass of skins in the chamber. Other aspects of operation in this second embodiment remain the same as for the first embodiment described. In both embodiments, the wedge shape assumed by the mass of crushed grapes in the compression chamber automatically creates a plugging effect, such that the skins cannot emerge until the desired extraction has been achieved.

Figure 4:
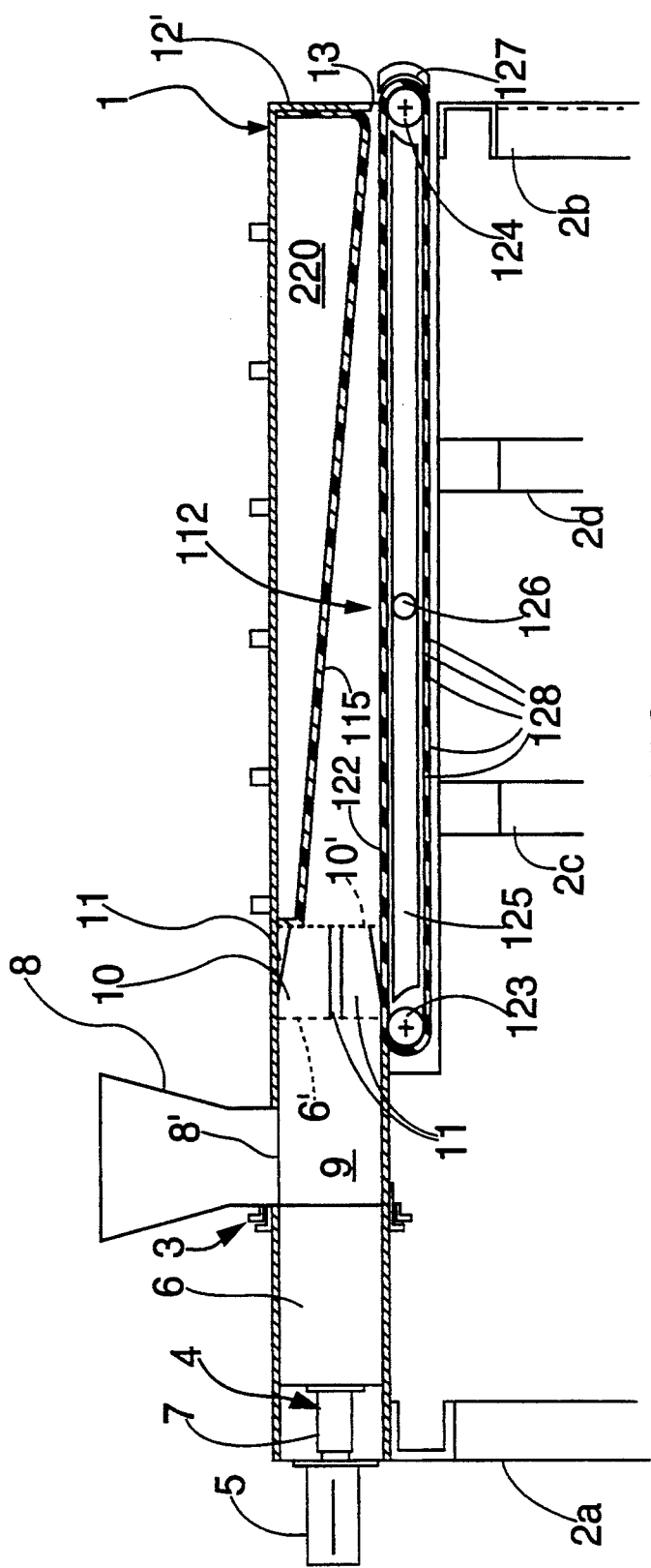
FIG. 4 is the schematic representation of a third embodiment showing a single inflatable cushion anchored uppermost to the compression chamber.

FIG. 4 illustrates a third embodiment of the invention. Again, parts common to the first and second embodiments are denoted by the same numbers, and warrant no further description. As opposed to utilizing a plurality of independent inflatable cushions, a single inflatable cushion 220 may be anchored uppermost to the compression chamber.

I claim:

1. An apparatus for extracting juice from grapes in a continuous operation, comprising:
    a compression chamber in which grapes are pressed to produce juice and pressed grape skins, said chamber having an opening in one portion thereof for receiving grapes therein and an outlet in another portion thereof from which pressed grape skins can be ejected, said compression chamber progressively decreasing in size from the portion having the opening therein to the portion having the outlet therein;
    means for introducing grapes in said opening of said compression chamber;
    a moveable flexible filtering belt defining the bottom of the compression chamber through which the juice may be removed; and
    an inflatable element defining the top of the compression chamber for applying predetermined pressure to the grapes.

2. The apparatus of claim 1 further comprising a sheet of flexible material secured to form the underside of said inflatable element for contact with grapes in the compression chamber to reduce friction and wear of the inflatable element from movement of grapes in the compression chamber.

3. The apparatus of claim 1 wherein the means for introducing grapes includes a feed hopper through which grapes may be fed toward said opening of said compression chamber and fluid driven pushing means comprising a reciprocating sliding ram for forcing grapes fed from said feed hopper through said opening in said compression chamber.

4. The apparatus of claim 1 further comprising an inlet chamber proximate said opening of said compression chamber and wherein said means for introducing grapes include a hopper through which grapes may be fed to said inlet chamber and fluid driven pushing means including a ram adapted to slide in a reciprocating manner through said inlet chamber to force grapes to move from said inlet chamber to said compression chamber through said opening therein.

5. The apparatus of claim 1 further comprising a frame and two end rollers, and wherein said moveable flexible filtering belt is supported by the frame and looped around the two end rollers.

6. The apparatus of claim 5 wherein said filtering belt comprises an upper portion defining the bottom of the compression chamber and a lower portion below the upper portion and wherein the apparatus further comprises means for washing said lower portion.

7. The apparatus of claim 5 wherein at least one of the rollers is power driven.

8. The apparatus of claim 1 further comprising a collection trough positioned below the compression chamber for collecting juice flowing through said filtering belt.

9. The apparatus of claim 8 wherein said collection trough includes an outlet from which juice may be removed.

10. The apparatus of claim 1 wherein said inflatable element increases in size from the portion of the compression chamber having the opening therein to the portion having the outlet therein.

11. The apparatus of claim 1 further comprising means for de-crusting and scraping said filtering belt.

12. The apparatus of claim 1 further comprising means for permitting flow of grapes in a direction into said compression chamber through said opening therein and for inhibiting the movement of grapes in the opposite direction.

13. The apparatus of claim 1 wherein said filtering belt comprises a multi-layer sheet including at least two different materials.

14. The apparatus of claim 13 wherein said materials include meshes.

15. The apparatus of claim 13 wherein said materials include filter nets.

16. The apparatus of claim 13 wherein said materials include screening fabrics.

17. The apparatus of claim 1 wherein said inflatable element comprises a plurality of individually inflatable sections.

18. An apparatus for extracting juice from grapes in a continuous operation, comprising:
- a compression chamber in which grapes are pressed to produce juice and pressed grape skins, said chamber having an opening at one end thereof for receiving grapes therein and an outlet at an opposite end thereof from which pressed grape skins can be ejected;
- means for forcing grapes in said opening of said compression chamber;
- a moveable flexible filtering belt defining the bottom of the compression chamber through which the juice may be filtered and removed; and
- an inflatable element defining the top of the compression chamber for applying predetermined pressure to the grapes, said inflatable element being shaped such that said compression chamber progressively decreases in size along the length of the chamber from the end having the opening therein to the end having the outlet therein.

19. The apparatus of claim 18 further comprising a sheet of flexible material secured to form the underside of said inflatable element for contact with grapes in the compression chamber to reduce friction and wear of the inflatable element from movement of grapes in the compression chamber.

20. The apparatus of claim 18 wherein the means for introducing grapes include a feed hopper through which grapes may be fed toward said opening of said compression chamber and fluid driven pushing means comprising a reciprocating sliding ram for forcing grapes fed from said feed hopper through said opening in said compression chamber.

21. The apparatus of claim 18 further comprising an inlet chamber proximate said opening of said compression chamber and wherein said means for introducing grapes include a hopper through which grapes may be fed to said inlet chamber and fluid driven pushing means including a ram adapted to slide in a reciprocating manner through said inlet chamber to force grapes to move from said inlet chamber to said compression chamber through said opening therein.

22. The apparatus of claim 18 wherein said inflatable element comprises a plurality of individually inflatable portions.

23. A machine for the extraction of juice from grapes in a continuous operation, comprising:
- a horizontally elongated box-shaped structure having a substantially rectangular cross-section, wherein the width of the structure is greater than its height;
- a frame for supporting said box-shaped structure;
- a compression chamber in the box-shaped structure for pressing grapes to produce juice and pressed grape skins, said chamber having an opening at one end thereof for receiving grapes therein and an outlet at an opposite end from which the pressed grape skins can be ejected, said compression chamber progressively decreasing in cross-sectional area along the length of the chamber from the end with the opening therein to the end with the outlet therein;
- an inlet chamber positioned in the box-shaped structure proximate said opening of said compression chamber;
- a hopper positioned on an upper part of the box-shaped structure through which grapes may be fed to said inlet chamber;
- a pushing device including a reciprocating sliding ram for forcing grapes from said inlet chamber into said opening of said compression chamber;
- an inflatable element defining the upper surface of the compression chamber for applying a predetermined pressure to the grapes in said compression chamber;
- a flexible filtering belt defining the bottom surface of the compression chamber and through which juice produced in the compression chamber is filtered and removed, the filtering belt being movably supported on a frame and two end rollers wherein at least one of said rollers is power driven; and
- a collection trough positioned below said compression chamber for receiving juice from the compression chamber, said collection trough including an outlet from which juice may be removed.

24. The machine of claim 23 further comprising a sheet of flexible material secured to form the underside of said inflatable element to reduce friction and wear of the inflatable element from movement of grapes in the compression chamber.

25. The machine of claim 23 wherein said inflatable element comprises a plurality of individually inflatable portions.

26. An apparatus for extracting juice from grapes in a continuous operation, comprising:
- a compression chamber in which grapes are pressed to produce juice and pressed grape skins, said chamber having an opening in one portion thereof for receiving grapes therein and an outlet in another portion thereof from which pressed grape skins can be ejected, said compression chamber progressively decreasing in size from the portion having the opening therein to the portion having the outlet therein;
- means for introducing grapes in said opening of said compression chamber;
- a moveable flexible filtering belt defining the bottom of the compression chamber through which the juice may be removed;

an inflatable element defining the top of the compression chamber for applying predetermined pressure to the grapes; and a sheet of flexible material secured to form the underside of said inflatable element for contact with grapes in the compression chamber to reduce friction and wear of the inflatable element from movement of grapes in the compression chamber.

27. The apparatus of claim 26 wherein said inflatable element comprises a plurality of individually inflatable portions.

28. The apparatus of claim 26 wherein said inflatable element increases in size from the portion of the compression chamber having the opening therein to the portion having the outlet therein.

* * * * *